United States Patent Office 2,752,315
Patented June 26, 1956

2,752,315

POLYMERIZED STYRENE MOLDING COMPOSITIONS

NS Kuettel, Arlington, N. J., assignor, by mesne assignments, to Curtiss-Wright Corporation, a corporation of Delaware No Drawing. Application September 2, 1950, Serial No. 183,087

6 Claims. (Cl. 260—23)

This invention relates to the manufacture of thermoplastic materials containing polymerized styrene or polystyrene for use in producing improved molding compositions, hereinafter referred to as being "innovatized" for extrusion and injection molding various articles, such as combs, toys, containers, novelties, tubes, rods, translucent articles, compacts, specialites and particularly sound records such as phonograph discs.

Among the objects of the invention is to generally improve polymerized styrene compositions of the character described "innovatized," that is, changed or altered from having the recognized characteristics of polystyrene molding products, which shall have a low cost per unit weight and capable of serving in the form of an "innovatized" polystyrene molding composition as a desirable replacement for higher priced molding resins, which shall produce molded articles of desired flexibility and pliability having a minimum brittleness and maximum strength, which said "innovatized" compositions shall be capable of being processed within wide range of molding temperatures and pressures, which shall have improved flowing properties during molding operation with a relatively short cooling period to enable faster cycles of said operation, which shall form molded structures free from tendency to warp, which shall be highly satisfactory to provide an inexpensive molded medium for sound recordations, such as phonograph playing discs in rendering high fidelity tonal and sound qualities, and which shall be practical and efficient to a high degree in use.

Other objects of the invention will in part be obvious and in part hereinafter pointed out.

The invention accordingly consists of improved features exemplified as hereinafter disclosed, the scope of the application of which will be indicated in the claims following.

Polymerized styrene compositions when used in molding processes are known to generally produce relatively brittle structure or articles and have been found unsatisfactory for many purposes and particularly for the manufacture of phonograph disc records thus requiring the utilization of more expensive resinous compositions for many practical purposes.

The formulation of ingredients with polystyrene "innovatized" to embody the invention has been found to have the following advantages over compositions containing polystyrene or other resinous ingredients heretofore used:

1. Cost per unit weight is relatively lower.
2. Capable of producing more flexible and pliable molded articles of greater strength and less brittle properties.
3. Can be extruded and injection molded within a greater range of operating temperature and pressure.
4. Has better molding flow properties.
5. Is relatively faster in cooling during molding thereby enabling an increase of quantity production cycles per unit of time.
6. Forms structures free to a great extent from warpage.
7. Produces molded articles of maximum toughness.
8. Is of proven excellent characteristics for economical production of phonograph disc records in quantity production of various desired diameters and thicknesses.

For molding articles in general, using improved "innovatized" polystyrene, the following formulation has been found to give satisfactory results employing injection multiple cavity molds.

Example I 100.0 parts of polystyrene resin
18.0 parts of diatomaceous silica
3.5 parts of carnauba wax
0.5 part of stearic acid It has also been found practical to vary the polystyrene contents of the above improved "innovatized" formulation within a range of from 66% to 97% and the corresponding ingredients from 34% to 3%, respectively, for injection molding of a large variety of articles.

Improved "innovatized" polystyrene composition embodying the invention may be prepared from dry or wet mixed ingredients or constituents, either by using a tumbling or rotating barrel or mixer of any well known construction in which said ingredients are processed, and may be carried out in forming two parts.

Part one may contain all the ingredients or constituents which serve to "innovatize" a commercially obtainable clear polymerized styrene hereinafter referred to as "straight," and part two may contain said straight polymerized styrene plus part one. In formulating part two all components become intimately mixed or blended aided by the clinging nature and porosity of the mineral filler and of the other "innovatizing" ingredients forming part one along with resulting static electricity created in the relative movements of the ingredients during the mixing operation.

Where it is found desirable to incorporate plasticizers and/or coloring ingredients in said part one, the coloring ingredients may first be added to the plasticizer, if used, and an intimate mixture made while also adding any or all lubricants, binders, waxes and fillers hereinafter described. Such part one mixture may then be passed through a suitable screen of fine mesh to eliminate lumps and assure homogeneity prior to blending part two.

The straight polystyrene is added to said screened mixture to form part two and the mixing operation carried on until all portions of the blend are uniform. In this latter condition of formulation, said part two mixture is ready for extrusion to further homogenize the composition as a partial preconditioning for molding.

Extrusion may be run at temperature from 320° to 470° F. in a screw extruding machine operating at high speed using a ribbon or a multiple hole orifice die for quantity production, the extruded product being carried and cooled on a conveyor belt run slightly faster than the extruder thus producing elongation with orientation of the particles of said product to give greater strength. If desired, fine filaments can also be produced by this method of operation. The extruded product may then be fed in the path of a rotating knife chopper and cut into 3/16" to 3/8" lengths or any other convenient size desired which can be collected in a suitable container as a stock pile of a partially preconditioned material, or a second extrusion may be run using the cut extruded product particles to insure complete homogeneity.

The final extruded cut stock material may be finely ground to a powder and thus fully preconditioned ready for injection molding. The choice of dies has not been found critical since the "innovatized" polystyrene composition after said preconditioning mold-flows better than the usual "straight" polymerized styrene molding materials.

Since the mold-flow property as above described is thus improved and the time of cooling has been found to be shortened, while temperature and pressure variations are not as critical with said above described preconditioned "innovatized" composition, improved molding operation is made possible over that experienced with "straight" polystyrene or polystyrene compositions used heretofore. Molded articles of said improved "innovatized" composition have been found to be easily removed from the molding die with a minium sticking, said articles forming structure minimizing to a great extent undesirable warpage.

The usual sprue formed in molding can be cut off immediately or cut off after cooling without showing the brittleness commonly observed with the usual polymerized styrene products.

For phonograph record disc production said preconditioned "innovatized" composition material can be injection molded into a grooved recorded record die, which forms the plastic record, the sprue being later cut off and the center of the record punched with a hole to conform with the standard phonograph record players.

Plasticity of said improved "innovatized" polystyrene resin can be varied by changing the relative proportions of said formulation. For example, in compounding said part one, waxes of both natural and synthetic types can be used, such as, carnauba wax, Acra wax, Stroba wax and other high melting point waxes and also the wax-like "Cumar" cumarone-indene resin. Acra wax denotes a synthetic wax which is a complex nitrogen derivative of the higher fatty acids and of which there are three commercially known types, one being designated merely as acrawax, and the others as acrawax B and acrawax C. The acrawaxes are characterized by definite physical attributes in particular their relatively high melting points. Stroba wax is a hard, light cream-colored synthetic wax having definite physical attributes including a melting point of 93° to 97° C. Fillers may be of the mineral filler type, such as diatomaceous silica of particles which for phonograph disc may be 1–4 microns in size to produce durability and lack of sound distortion, improve sound track and increase toughness with lower moisture absorption, and increased heat resistance. Other types of fillers such as barium sulfate, calcium carbonate, clay, slate and titanium products can be incorporated, although they are not critical.

When using diatomaceous silica as a mineral filler, which is inorganic in nature, chemically inert, non-reactive and non-shrinking, as described above, the improved composition has imparted to it a hardness property of about three times that of polystyrene. Since said mineral filler is porous, it is capable during formulation to absorb the liquid or liquified ingredients.

Formulation constituents, such as waxes, binders or lubricants when heated, soften to a flowing consistency and are partially embedded within the mineral filler and partially carried on the surfaces thereof thereby forming an anchored bonded structure of the "innovatized" polystyrene after molding.

Lubricants may consist of stearic acid, although the metal stearates, such as zinc or calcium stearate can also be used. When found desirable, as in Example IV, following, plasticizers of the dibutyl and tricresyl derivative types can be utilized and suitable dyestuffs or coloring ingredients consisting of pigments, lakes or dyes of both inorganic and oil soluble types and toners may also be used as constituents in the "innovatized" polystyrene formulation.

It is possible to remold my "innovatized" compositions making it economical to prevent loss by reclaiming defective or scrap pieces.

It has been found that the characteristic sharp ringing sound of articles molded of polystyrene when dropped on a hard surface, for example "poker chips," are entirely altered when such articles are molded of the improved "innovatized" polystyrene to a degree to have a noticeable resonant sound, and when said improved molded compositions embodying the inventions are used for making combs the teeth thereof as they pass through the hair produce an agreeable "whispering" resonance.

Said improved mold-flow quality possessed in processing the "innovatized" polystyrene appears to be due to the aforementioned small micron-sized particles of the filler blended with the other constituents, which under increased temperature and pressure provides such highly desirable gliding or flowing properties so that even the most intricate dies can be completely filled in a minimum charge injection period.

Not only has a desirable improved mold-flow of the "innovatized" composition embodying the invention been found over that experienced using "straight" polystyrene when molding either with powder or granulation stock, but also faster cooling is experienced and less mold sticking results thereby making possible increased production for the same operating time.

The waxes included in the improved formulation serve also as lubricants in addition to the stearic acid, when the latter is used, for making the releasing of molded articles from the dies easier than would otherwise be experienced.

The waxes and mineral filler appear to be effective and account for the increased faster cooling properties due to the inorganic or mineral filler particle dispersion coated with organic waxes and resins thereby providing a material that is interlaced with non-conductors of heat. Thus articles molded of "innovatized" polystyrene by injection process can be removed from between the dies without sticking immediately after fully charging.

Undesirable brittleness so characteristic of "molded straight" polystyrene articles can be practically eliminated by practising the improved invention to such a degree that the flexibility, pliability and toughness is increased permitting articles molded of the "innovatized" polystyrene to withstand rough handling. Thus a molded seven-inch record of said improved last mentioned material may be bent out of alignment in a ninety degree angle relation without breaking while a similarly molded record disc of "straight" polystyrene which is brittle has practically no or very slight bending properties. The latter when struck on a corner of an anvil will be shattered by a single blow while record discs of "innovatized" polystyrene can withstand three similar blows before being noticeably cracked.

When such molded article is a phonograph disc, on removal from the mold and being supported horizontally to overhang a table edge, it has been found to retain its shape without warpage or distortion, a characteristic not found when similarly molded discs of "straight" polystyrene are made. The latter when so tested warp, sag, and bend out of their molded shape.

Although it is well known that "straight" polystyrene cannot be readily molded into phonograph record discs that are capable of satisfactorily reproducing sound of suitable tonal quality, I have discovered that such commercial styrene resin may be "innovatized" and made suitable and highly efficient to serve for phonograph sound reproducing purposes by using my improved formulation with waxes, fillers, binders, lubricants and plasticizers as hereinafter mentioned.

Furthermore, phonograph records produced from said improved "innovatized" polystyrene show by the Standard Wear Test as recommended by the Association of Phonograph Manufacturers, that over one hundred and twenty-five playings can be made yet still retaining satisfactory tonal quanities against only fifteen playings when a worn out condition is reached for similar records molded of "straight" polystyrene.

In practising the invention, the improved "innovatized" polystyrene resin composition may include waxes from 2 to 5%; fillers from 1 to 30%; plasticizers from 1 to 6%; lubricants from 0.2 to 0.6%; and coloring ingredients from 0.5 to 3%. The above ingredients or constituents may consist of several variations and of more than one variety of any one type. Absence of coloring ingredients produces a translucent appearance, similar to nylon in appearance. Absence of fillers and coloring ingredients produces a transparent appearance.

Although most waxes are not compatible with polymerized styrene, by blending with the other types of ingredients or constituents and homogenizing by extruding as described above, a thoroughly bonded composition precondition results. I have also discovered several variations in such composition that will produce playing disc records of excellent quality, all of such compositions being also suitable for a variety of molded articles other than records.

Said improved "innovatized" polystyrene composition may contain "straight" polymerized styrene in a wide range of formulations as above set forth for producing many desirable variations and qualities of many improved molding compositions for different purposes and uses.

The following examples illustrate the types of "innovatized" polystyrene compositions which have been found satisfactory for producing phonograph sound records.

*Example II*

100.0 parts of polystyrene resin
27.0 parts of diatomaceous silica
3.5 parts of carnauba wax
2.0 parts of barium sulfate
0.5 part of stearic acid This composition has fast curing properties, cools rapidly and forms sound grooves having relatively tough wearing walls that are capable of rendering high fidelity tonal and sound qualities.

*Example III*

100.0 parts of polystyrene resin
34.0 parts of diatomaceous silica
6.0 parts of carnauba wax
3.0 parts of coumarone-indene resin
2.0 parts of barium sulfate
0.5 part of stearic acid The above composition has a better glossy appearance than Example II. It is more flexible and stronger.

*Example IV*

100.0 parts of polystyrene resin
20.0 parts of diatomaceous silica
6.0 parts of carnauba wax
4.0 parts of plasticizers of the dibutyl and tricresyl derivatives
0.5 part of stearic acid This improved composition may be used to produce sound records of the regular type and also to produce the microgroove type. The records produced therewith are glossy in appearance, flexible, resilient, non-brittle and have faithful reproduction of tonal sounds. They are tougher, stronger and have less background noise than sound records which are commercially available at the present time. The records are resistant to water absorption. They can withstand long continuous replaying using a steel needle or lifetime needle. The abrasive quality will condition any steel needle for maximum results with minimum needle wear. Any commercially available needle or sound pick-up for reproduction can be used on records manufactured in the above composition.

While Example IV produces disc records giving optimum desired results as to the quality of tonal reproduction and ability to withstand excessive wear after continuous playing, similar "innovatize" compositions having diatomaceous silica in amounts varying from approximately 15 to 27 parts have been found to produce acceptable disc records.

Variations or modifications of the ingredients mentioned in the examples can be made to accommodate different requirements. While Example IV produces a highly desirable quality sound record a variation thereof may be used to produce compositions suitable for any type of molding or producing other classes of molded articles. As is clear from the above description elimination or change in any of the proportions of the "innovatizing" constituents will produce a composition of different characteristics as aforementioned.

It will thus be seen that there is provided improved polymerized styrene molding compositions whereby the several objects of this invention are achieved and which are well adapted to meet the conditions of practical use.

As various possible embodiments might be made of the above invention, and as various changes might be made in the embodiments above set forth, it is to be understood that all matter herein set forth is to be interpreted as illustrative and not in a limiting sense.

Having thus described my invention, I claim as new and desire to secure by Letters Patent:

1. An injection molding material comprising substantially the following constituents:

100.0 parts of polystyrene resin
20.0 parts of diatomaceous silica
6.0 parts of wax material selected from the group consisting of carnauba wax, Acra wax, Stroba wax and coumarone-indene resin
0.5 part of stearic acid.

2. A resinous injection molding material comprising substantially the following constituents:

100.0 parts of polystyrene resin
18.0 parts of diatomaceous silica
3.5 parts of carnauba wax
0.5 part of stearic acid.

3. A material for molding disc records comprising substantially the following constituents:

100.0 parts of polystyrene resin
20.0 parts of diatomaceous silica
6.0 parts of wax material selected from the group consisting of carnauba wax, Acra wax, Stroba wax and cumarone-indene resin
4.0 parts of plasticizers of the dibutyl and tricresyl derivatives
0.5 part of stearic acid.

4. A material for molding disc records comprising one hundred parts of polystyrene resin, approximately thirty-four parts of diatomaceous silica, approximately six parts of wax, approximately three parts of coumarone-indene resin, approximately three parts of barium sulfate and one-half part of stearic acid.

5. A material for injection molding disc records comprising substantially the following:

100 parts of polymerized styrene
18 to 34 parts of diatomaceous silica
3.5 to 6 parts of wax material selected from the group consisting of carnauba wax, Acra wax, Stroba wax and cumarone-indene resin.

6. A material for injection molding disc records comprising substantially the following:

100 parts of polymerized styrene
18 to 34 parts of diatomaceous silica ground to from 1 to 4 micron size
3.5 to 6 parts of wax material selected from the group consisting of carnauba wax, Acra wax, Stroba wax and cumarone-indene resin.

References Cited in the file of this patent

UNITED STATES PATENTS

| | | |
|---|---|---|
| 2,028,126 | Warren | Jan. 14, 1936 |
| 2,056,796 | Macht et al. | Oct. 6, 1936 |
| 2,116,986 | Stose | May 10, 1938 |
| 2,127,381 | Hermann et al. | Aug. 16, 1938 |
| 2,353,228 | Ducca | July 11, 1944 |
| 2,365,375 | Bailey et al. | Dec. 19, 1944 |

OTHER REFERENCES

Morrel: Synthetic Resins, 2nd ed., Oxford University Press, London (1943), page 188.